US008990201B1

(12) United States Patent
Johnston et al.

(10) Patent No.: US 8,990,201 B1
(45) Date of Patent: Mar. 24, 2015

(54) IMAGE SEARCH RESULTS PROVISONING

(75) Inventors: Emily Johnston, San Francisco, CA (US); George M. N. Ruban, Somerville, MA (US); David Black, Mountain View, CA (US); Sarah J. Bell, Providence, RI (US); Gabriel Wolosin, San Mateo, CA (US); David Kogan, Natick, MA (US)

(73) Assignee: Google Inc., Mountain View, CA (US)

( * ) Notice: Subject to any disclaimer, the term of this patent is extended or adjusted under 35 U.S.C. 154(b) by 545 days.

(21) Appl. No.: 13/288,195

(22) Filed: Nov. 3, 2011

(51) Int. Cl.
*G06F 7/00* (2006.01)
*G06F 17/30* (2006.01)

(52) U.S. Cl.
USPC ........... 707/736; 707/722; 707/723; 707/748; 707/752; 707/754; 707/999.003

(58) Field of Classification Search
CPC .......... G06F 17/3064; G06F 17/30864; G06F 17/30867; G06F 17/30646; G06F 17/30672; G06F 17/30799; G06F 17/3087; G06F 17/30902; G06F 17/30; G06F 17/30011; G06F 17/30247; G06F 17/30395; G06F 17/30398
See application file for complete search history.

(56) References Cited

U.S. PATENT DOCUMENTS

| | | | | |
|---|---|---|---|---|
| 7,370,034 | B2 * | 5/2008 | Franciosa et al. | 707/749 |
| 7,617,195 | B2 * | 11/2009 | Liang et al. | 1/1 |
| 2011/0202520 | A1 * | 8/2011 | Teran et al. | 707/708 |
| 2011/0282867 | A1 * | 11/2011 | Palermiti et al. | 707/722 |

OTHER PUBLICATIONS

Google, "Family Safety Center," 3 pages, [online] [retrieved from the Internet Jul. 24, 2012], URL: http://www.google.com/goodtoknow/familysafety/tools/.
Google, "Inside Search," 4 pages, [online] [retrieved from the Internet Jul. 24, 2012], URL: http://www.google.com/insidesearch/features/instant/about.html.
Google, "Using Yahoo! SafeSearch," 1 page, [online] [retrieved from the Internet Jul. 24, 2012], URL: http://help.yahoo.com/kb/index?locale=en_US&page=content&y=PROD_SRCH&id=SLN2247.
Google, News from Google, "Google Begins Move to Universal Search," 3 pages, [online] [retrieved from the Internet Jul. 24, 2012], URL: http://googlepress.blogspot.com/2007/05/google-begins-move-to-universal-search_16.html.

* cited by examiner

*Primary Examiner* — Azam Cheema
(74) *Attorney, Agent, or Firm* — Fish & Richardson P.C.

(57) ABSTRACT

Methods, systems, and apparatus, including computer program products, for selectively presenting search results responsive to search query suggestions. In one aspect includes receiving a partial search query including one or more characters; generating a first query suggestion based on the partial search query; determining whether the first query suggestion meets a filtering criterion, where the filtering criterion is a criterion specifying one or more filtering criterion topics against which the first query suggestion is evaluated independent of search results responsive to the first query suggestion; providing the first query suggestion; and in response to determining that the first query suggestion meets the filtering criterion, preventing a first set of one or more images responsive to the first query suggestion from being presented to a user.

17 Claims, 5 Drawing Sheets

IMAGE SEARCH RESULTS PROVISONING

BACKGROUND

This specification describes technologies relating to search query suggestions and image search results.

The Internet provides access to a wide variety of resources, for example, video files, image files, audio files, or Web pages. Such resources can include content associated with particular subjects, book articles, or news articles. A search system can select one or more resources in response to receiving a search query. A search query can be data that a user submits to a search engine, e.g., a search engine of a search system, to satisfy the user's informational needs. A search query is usually in the form of text, e.g., one or more query terms. In response to receipt of a search query, the search system selects and scores resources based on their relevance to the search query and their importance relative to other resources to provide search results that link to the selected resources. Search results are typically presented in an ordered list that is determined based on the scores.

Search systems can provide search suggestions to users to help users satisfy their informational needs. As used herein, the term "query suggestion" is a prediction of an intended search query from a user or a suggestion for a query that can be used to refine the user's search or refine the user's search strategy based, in part, on the characters entered by the user in a query input field. Some search systems provide query suggestions in the form of a list as a user is typing a query. A client device typically sends suggestion requests to a search engine with each keystroke, and the search engine provides the query suggestions with prefixes that match the entered characters. Once received, the client device displays these suggestions for user selection.

With the query suggestions, some search systems also provide predicted search results related to the query suggestions. These predicted search results can include images. However, as the query suggestions are, for example, predictions of a user's intended search query, some of the query suggestions may not accurately reflect the intended search query. Query suggestions that do not accurately predict the user's intended search query can result in predicted search results that are not likely to satisfy the user's informational needs. Further, in some scenarios, these undesired search results can potentially be objectionable to the user, e.g., graphic image search results.

SUMMARY

This specification describes technologies relating to providing search query suggestions and search results related to the search query suggestions.

In general, one aspect of the subject matter described in this specification can be embodied in methods that include the actions of receiving a partial search query including one or more characters; generating a first query suggestion based on the partial search query; determining whether the first query suggestion meets a filtering criterion, where the filtering criterion is a criterion specifying one or more filtering criterion topics against which the first query suggestion is evaluated independent of search results responsive to the first query suggestion; providing the first query suggestion; and in response to determining that the first query suggestion meets the filtering criterion, preventing a first set of one or more images responsive to the first query suggestion from being presented to a user.

Particular embodiments of the subject matter described in this specification can be implemented so as to realize one or more of the following advantages. Presenting predicted search results, e.g., image search results, related to query suggestions provided to a user to aid the user in determining if a query suggestion will satisfy the user's informational needs without additional input from the user, e.g., without the user entering additional characters into the query input field to complete the query. These predicted search results are selectively displayed such that some predicted search results for particular query suggestions are not displayed to the user to reduce the likelihood of displaying certain undesired search results that may be objectionable to a user, e.g., objectionable images. However, these potentially undesired or objectionable search results can be displayed in response to additional input from the user indicating a desire to view the search results, e.g., the indication can be a keystroke or a mouse click. Accordingly, a full set of unfiltered predicted search results can be displayed to the user in response to the additional input.

Furthermore, filtering potentially objectionable image search results on a per-search result basis can be minimized by precluding the showing of predicted search results for a predicted query or showing the predicted search results for the predicted query. In addition, the search system can preclude the surfacing of undesirable or objectionable image search results for resources that have not been classified, e.g., a resource that has been recently uploaded, but have been indexed by the search system by filtering on a per-predicted query basis. Thus, if a new resource includes potentially objectionable material, a corresponding search result associated with the new resource will be shown in response to additional input from a user.

Each of the advantages above is optional and can be achieved separately or in combination.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This specification describes technologies relating to selectively presenting image search results responsive to a query suggestion generated while a user enters characters of a query. In some implementations, the determination of whether to present, e.g., provide to a client device or display on the client device, the image search results is based on a determination of whether the query suggestion meets a filtering criterion. If the does not meet the filtering criterion, image search results responsive to the query suggestion are presented for display to a user. Conversely, if the meets the filtering criterion, image search results responsive to the query suggestion can be prevented from being presented to the user, e.g., without additional user action.

The filtering criterion can include a topic or set of topics, e.g., subject matter classifications, and the query suggestion can be classified as belonging to one or more topics. In general, the filtering criterion or criteria can identify topics that are likely to be graphic or otherwise potentially objectionable to an audience-at-large such as, for example, medical images. For example, topics can be identified as graphic or otherwise objectionable or likely to be graphic or otherwise objectionable by human evaluators or through an automated process relying on one or more trained computer systems.

Once classified, a query suggestion's topics can be evaluated against or compared with the filtering criterion topic or topics and a determination of whether to display or not display image search results can be made based on the outcome of the evaluation or comparison. For example, in some implementations, if a query suggestion is classified as belonging to a medical topic, e.g., a query suggestion of "measles," and the filtering criterion includes the medical topic, then image search results responsive to the measles query suggestion will not be initially displayed to a user because medical images related to measles may be graphic or objectionable to some users. If the user does desire to view the image search results, the user, through a subsequent affirmative action can cause the results to be displayed. For example, the affirmative action can be a user input, such as, a keystroke or a mouse click that is initiated subsequent to the image search results being prevented from being displayed for the query suggestion.

In some scenarios, a query suggestion is not accurate because it is a prediction of a user's intended search query. As a result, in some implementations, search results related to an inaccurate query suggestion will not address the user's informational needs. Therefore, in these scenarios, it can be desirable to prevent potentially objectionable image search results related to the query suggestion from being displayed to a user. However, in other scenarios, a query suggestion may, in fact, be accurate and address or appear to address the user's informational needs. Therefore, in these scenarios, it can be desirable, upon a confirmatory indication from the user, to permit the user to view the image search results regardless of their nature. In this way, potentially undesired or objectionable image search results related to query suggestions can be prevented from being unnecessarily or unexpectedly displayed to a user.

§2.0 Example Environment

Figure 1:
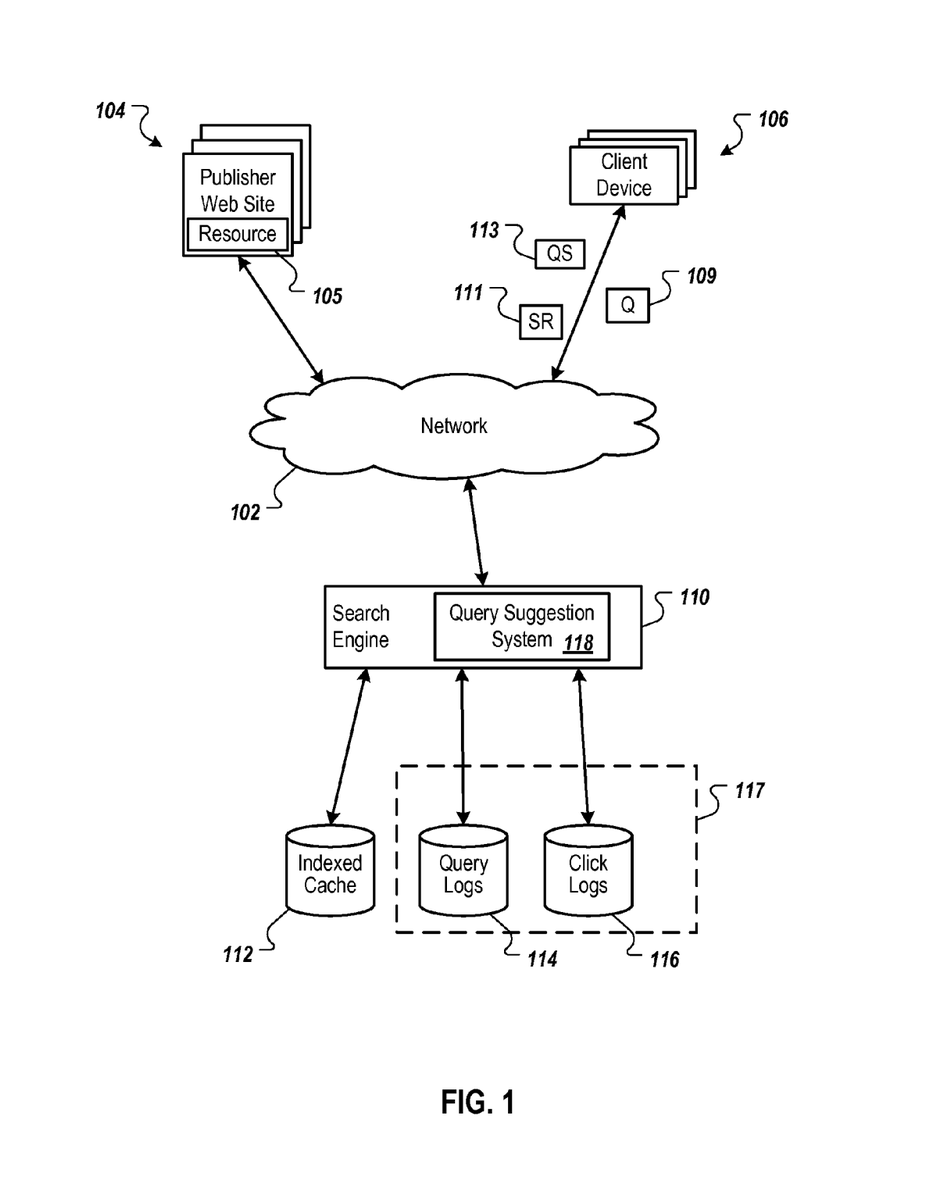
FIG. 1 is a block diagram of an example environment in which a search engine provides search services.

FIG. 1 is a block diagram of an example environment 100 in which a search engine 110 provides search services. A computer network 102, such as a local area network, "LAN", wide area network, "WAN", the Internet, or a combination thereof, connects publisher web sites 104, client devices 106, and the search engine 110. The example environment 100 may include many thousands of publisher web sites 104 and client devices 106.

A publisher web site 104 is a one or more web page resources 105 associated with a domain name. A publisher web site 104 can be hosted by one or more servers. An example web site can include a collection of web pages formatted in hypertext markup language, "HTML," that can contain text, graphic images, multimedia content, and programming elements, such as scripts. In some implementations, a publisher web site 104 is maintained by a publisher, e.g., an entity that manages and/or owns the web site.

A resource can be any data that is provided by a publisher over the network 102 and associated with a resource address. For example, resources can include HTML pages, word processing documents, portable document format, "PDF," documents, images, videos, and feed sources. The resources can include content, such as, text, pictures, and so on, and may include embedded information, such as meta information and hyperlinks, and/or embedded instructions such as JavaScript scripts.

A client device 106 can be an electronic device that is under the control of a user and capable of requesting and receiving resources 105 over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a client device 106 to display text, images, videos, music and other information typically located on a web page at a website on the world wide web or a local area network. In some implementations, a user may be allowed to interact with the displayed content using a client device 106.

To facilitate searching of these resources 105, the search engine 110 can identify the resources by crawling the publisher web sites 104 and indexing the resources 105 provided by the publisher web sites 104. The indexed and, optionally, cached copies of the resources 105 are stored in an indexed cache 112.

The client devices 106 submit search queries 109 to the search engine 110. The search queries 109 are submitted in the form of a search request that includes the search request and, optionally, a unique identifier that identifies the client device 106 that submitted the request. The unique identifier can be data from a cookie stored at the client device 106, a user account identifier if the user maintains an account with the search engine 110, or some other identifier that identifies the client device 106 or the user using the client device 106.

In response to the search request, the search engine 110 can use the indexed cache 112 to identify resources 105 that are relevant to the search queries 109. The search engine 110 identifies the resources in the form of search results 111 and returns the search results 111 to the client devices 106 in a search results page. A search result 111 can be data generated by the search engine 110 that identifies a resource 105 that satisfies a particular search query, and includes a resource locator for the resource 105. An example search result 111 can include any, or a combination, of a web page title, a snippet of text extracted from a web page, and a universal resource locator "URL," of a web page.

The search results 111 are ranked based on scores related to the resources identified by the search results 111, such as information retrieval, "IR," scores. In some implementations an IR score can be based on a quality of the resource and a relevancy of the resource. In some implementations, the IR scores are computed from dot products of feature vectors corresponding to a query and a resource, and the ranking of the search results 111 is based on relevance scores that are a combination of the IR scores and authority scores. The combination can be a sum, product or any other combination. The search results 111 are ordered according to these scores and provided to the client device 106 according to the order.

The client devices 106 receive the search results pages and render the pages for presentation to users. In response to a user selecting a search result 111 at a client device 106, the client device 106 requests the resource identified by the resource locator included in the selected search result. The server hosting a publisher web site 104 associated with the resource receives the request for the resource from the client device 106 and provides the resource to the requesting client device 106.

In some implementations, the search queries 109 submitted from the client devices 106 are stored in query logs 114. In some implementations, click data associated with the search queries 109 and the web pages referenced by the search results are stored in click logs 116. Accordingly, the query logs 114 and the click logs 116 can store search history data 117 that include data from and related to previous search requests associated with unique identifiers. The click logs 116 can define actions taken responsive to search results provided by the search engine 110. The query logs 114 and click logs 116 can be used to map search queries submitted by the client devices 106 to web pages that were previously identified in search results in response to similar search queries, e.g., search history data are associated with identifiers so that a search history for each identifier can be accessed. The click logs 116 and query logs 114 can thus be used by the search engine 110 to determine sequences of queries submitted by the client devices 106, the actions taken in response to the queries, and how often the queries are submitted. In some implementations, the data stored in the click logs 116 and the query logs 114 is anonymized.

§3.0 Query Suggestions and Search Results

In addition to providing search results in response to queries, the search engine 110, by use of a query suggestion system 118, provides query suggestions 113 and corresponding search results responsive to the query suggestions 113 to a client device 106. The query suggestions 113 can be provided by the query suggestion system 118 in response to a query suggestion request from the client device 106. The query suggestion system 118 can access the search history data 117 and determine a list of query suggestions based on previously submitted search queries that have characters or characteristics in common with or similar to the partial search query entered by a user, and provides one or more of the query suggestions and a corresponding sets or sets of search results to the client device 106, as described in more detail below with reference to FIGS. 2A-E.

Figure 2A:
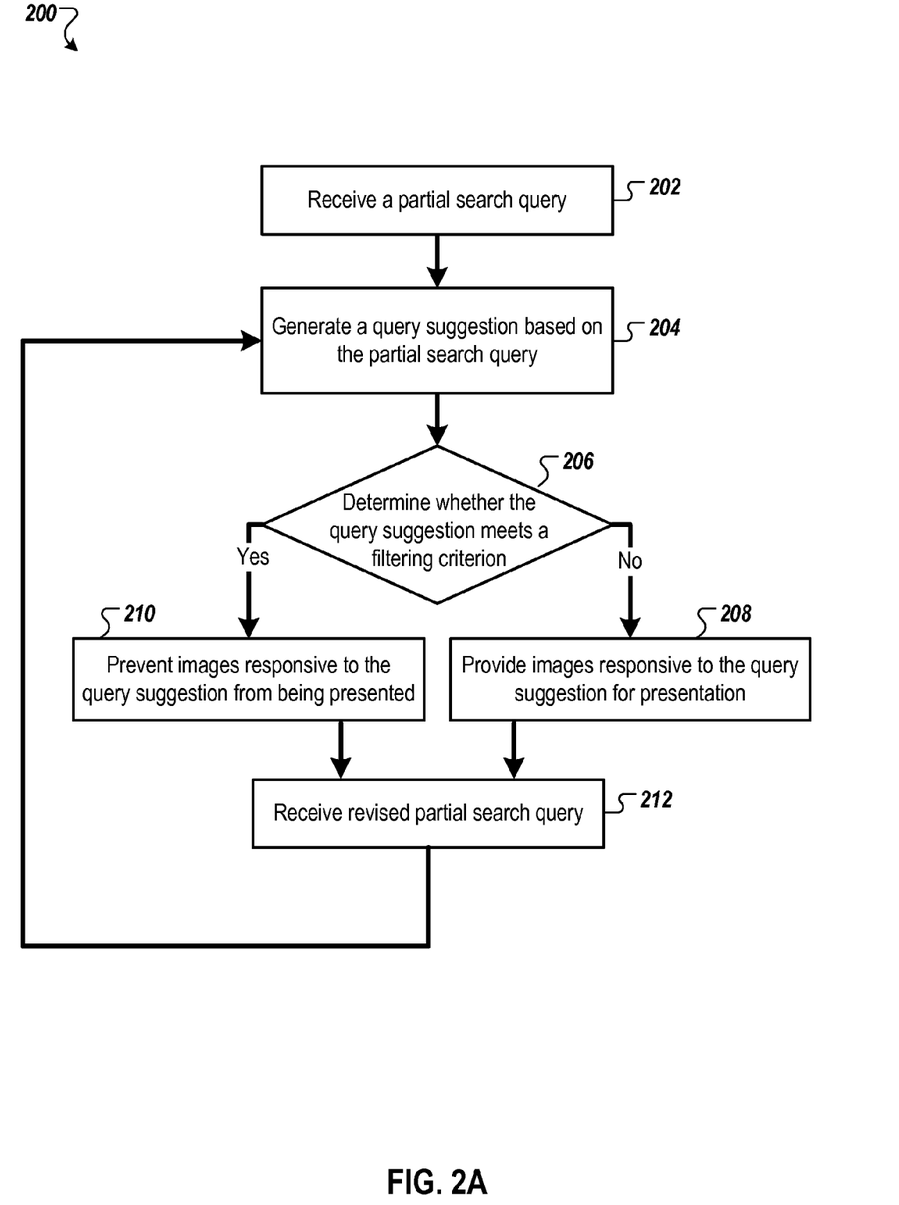
FIG. 2A is a flow diagram of a process for providing search results related to search query suggestions.

FIG. 2A is a flow diagram of a process for providing search results related to search query suggestions. The process 200 can be implemented in a data processing apparatus in which the search engine 110 is implemented.

The process 200 receives a partial search query comprising one or more characters, at process 202. For example, the query suggestion system 118 receives a query suggestion request including partial search query data from a client device 106, where the partial search query data specify a partial search query entered by a user in a query input field.

A partial search query can include one or more characters entered by a user in a query input field. More generally, in some implementations, a partial search query is a search query including less than all of the characters or words in a corresponding final search query or a search query that includes characters or words different from those in a corresponding final search query. In some scenarios, a partial search query can be one or more characters that define a prefix or stem of a word, or can also be an entire word or words. For example, the letter "c" is a stem for the words "canary," "California," etc., e.g., final search query.

To illustrate, assume a client device 106 requests a search resource from the search engine 110. The search engine 110 provides the requested search resource and interface instructions to the client device 106. The search resource and interface instructions cause the client device 106 to generate a search interface that includes a query input field. For example, the client device 106 can launch a web browser and request a web, an image, or a video search page from the search engine 110. The search engine 110 can provide HTML and scripts that cause the client device 106 to generate the search interface with the query input field. The query input field can receive query characters from a user, e.g., keystroke inputs forming the partial search query, and provides each input or group of inputs, e.g., a most recent input and subsequent inputs for a partial search query, to the query suggestion system 118 in the form of a query suggestion request. Thus, as the user enters the query "canary", the following partial search queries are generated for each respective query suggestion: c, ca, can, cana, canar, and canary.

The process 200 generates a query suggestion based on the partial search query, at process 204. In some implementations, the query suggestion system 118 generates a query suggestion or multiple query suggestions based on the received characters of the partial search query and the search history data 117 associated with the unique identifier of the client device 106 that submitted the query suggestion request. The query suggestions can be, for example, suggestions based on related queries stored in query logs 114 that occur frequently, and then filtered according to the particular search history data 117 associated with a user of a client device 106. For example, the query suggestion system 118 can access the search history data 117 and determine query suggestions for a partial search query that includes the characters "me" by locating final search queries that include the characters "me," e.g., "metro train," "meat," "mega university," etc.

In response to the query suggestion request, the query suggestion system 118 identifies and ranks the query suggestions according to an order from highest rank to a lowest rank, and provides the client device 106 with one or more of the query suggestions. Various ranking algorithms can be used. In some implementations, the query suggestions are ranked based on the probability of the particular query suggestion being selected by a user, e.g., based on the search history data 117.

The client device 106 receives the query suggestions and, for example, renders the query suggestions according to an order, if there are multiple query suggestions. The query suggestions can be presented in a query suggestion box according to an order from a highest rank to a lowest rank. The query suggestions can be presented in the query suggestion box such that the first presented query suggestion, e.g., "metro train," has the highest probability of being selected by a user, the next presented query suggestion, e.g., "meat," has the second highest probability, and so on. For example, in some implementations, probability data indicates which of the query suggestions has the highest probability of being the final search query, e.g., "metro train," based on the received characters in the partial search query and the search history data 117.

The process 200 determines whether the first query suggestion meets a filtering criterion, at process 206. In some implementations, the query suggestion system 118 determines whether the highest ranked query suggestion, e.g., the first query suggestion, meets a filtering criterion. The filtering criterion is a criterion or criteria specifying topics, "filtering criterion topics," against which the first query suggestion is evaluated. In some implementations, the first query suggestion is evaluated independent of search results responsive to the first query suggestion.

The filtering criterion topics can, for example, specify topics that may be associated with potentially graphic or objectionable content. For example, potentially graphic or objectionable content can be images depicting medical procedures, e.g., surgery, medical conditions, e.g., measles, or explicit subject matter.

In some implementations, as described below, the query suggestion system 118 classifies the first query suggestion as belonging to one or more topics, "query suggestion topics," and compares the filtering criterion topics against the query suggestion topics. For example, the filtering criterion topic can specify a medical topic and the first query suggestion "measles" can be classified as a medical topic. In this example, the query suggestion system 118 compares the medical query suggestion topic with the medical filtering criterion topic and determines the first query suggestion meets or satisfies the filtering criterion. In some implementations, a query suggestion meets or satisfies a filtering criterion if the query suggestion is classified as belonging to one or more query suggestion topics that match one or more filtering criterion topics specified by the filtering criterion. In some scenarios, there can be many filtering criterion topics and the query suggestion system 118 can compare each of the filtering criterion topics with each of the query suggestion topics.

The classification of the first query suggestion and determination of whether the first query suggestion meets the filtering criterion can occur prior to the query suggestions, including the first query suggestion, being provided to the client device 106, concurrent with the query suggestions being provided to the client device 106, or after the query suggestions have been provided to the client device 106, but before the presentation of any search results responsive to the query suggestions to a user via the client device 106.

In some implementations, the determination of whether the first query suggestion meets the filtering criterion is made independent of the search results responsive to the first query suggestion. As a result, in some implementations, the query suggestion system 118 does not rely on the classification or categorization of individual web resources or web sites, e.g., search results. Thus the query suggestion system 118 can use "query level" filtering criteria as opposed to "results level" filtering criteria, which are based on the subject matter or content of individual search results, for example, as classified or indexed by the search engine 110.

Given the complexities of classifying and categorizing, e.g., indexing, web resources and the sheer volume of new and modified web resources on the network 102, timely and accurate classification and categorization of web resources is challenging. For example, a web resource related to knee braces may include graphic images of an arthroscopic knee surgery. If the web resource has not been classified or categorized as having such graphic images, e.g., because it has been recently updated to include the images, then in response to a search query for "knee braces," a system using results level filtering criteria targeted to filter graphic medical images may not identify and filter the web resource related to knee braces. This, for example, could result in the web resource being presented as a search result despite the results level filtering criteria targeted to filter out such content from the search results. Conversely, in some implementations, a system using query level filtering criteria targeting medically related topics would identify and filter the web resource based on the query itself and not any search results related to the query.

Similarly, the query suggestion system 118 can evaluate the first query suggestion at a query filtering criteria level, e.g., the filtering criterion. Accordingly, in some implementations, the query suggestion system 118 does not depend on the classification or categorization of individual search results, e.g., web resources related to the query suggestion, to determine if the first query suggestion meets the specified filtering criterion. In this manner, the query suggestion system 118 provides a robust filtering scheme.

The process 200, in response to determining that the first query suggestion does not meet the filtering criterion, provides search results, e.g., image search results, responsive to the first query suggestion for presentation to a user, at process 208. In some implementations, the query suggestion system 118 provides image search results responsive to the first query suggestion in response to a determination that the first query suggestion does not meet the filtering criterion. For example, in some implementations, the query suggestion system 118 provides the first query suggestion to the client device 106, and provides the image search results if, e.g., only if, the query suggestion topics do not match any topics specified by the filtering criterion. The query suggestion system 118 can then provide search results responsive to the first query suggestion, along with the first query suggestion and other query suggestions, to the client device 106 for display, as described with reference to FIG. 2B.

Figure 2B:
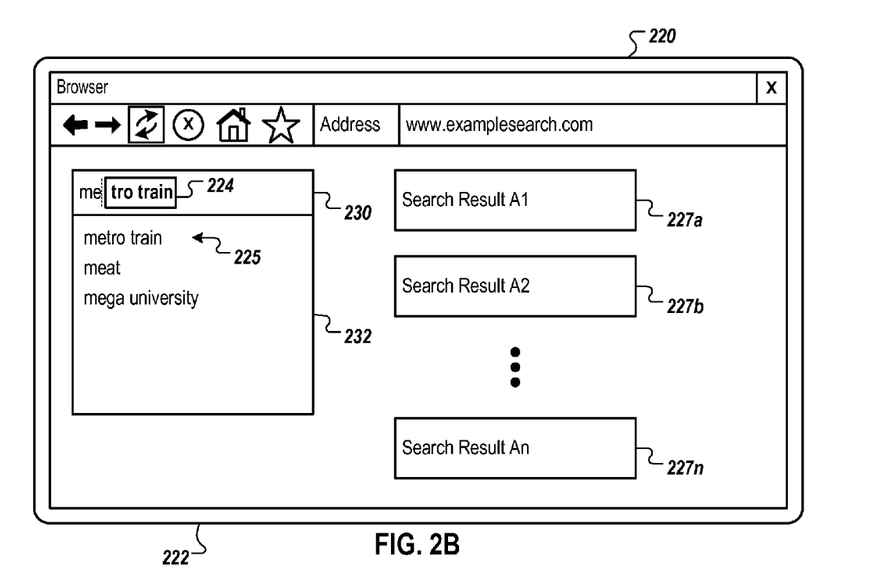
FIGS. 2B-2E depict a web search page displaying query suggestions and search results responsive to the query suggestions.

FIG. 2B shows a query suggestion box 232 with query suggestions and related search results 227. The web search page 220 can be provided by the search engine 110 or the search service to the client device 106, described above, in response to a request for a search resource, e.g., a search page.

The web search page 220 includes a search interface 222. The search interface 222 includes a query input field 230 and can display search results responsive to a query suggestion associated with a search query in the query input field 230. For example, the web search page 220 can display web, image, video, product, or document search results.

In response to the partial search query "me" in the query input field 230, the query suggestion system 118 provides query suggestions "metro train," "meat," and "mega university." For example, a user has entered the text "me" into the query input field 230 but is unsure about the specific spelling of the word "measles," e.g., the final search query desired by the user. The query suggestion system 118 provides query suggestions in the query suggestion box 232 in order to help the user choose a search query.

The query suggestions in the query suggestion box 232 are ranked according to an order. For example, the query suggestions can be ranked based on the probability that the user will select the respective query suggestion. In the example, "metro train" has the highest probability and is ranked first, "meat" has the second highest probability and is ranked second, and "mega university" has the lowest probability of being selected by a user and is ranked last and displayed at the bottom of the query suggestion box 232.

In query suggestion completion box 224, the query suggestion system 118 causes the client device 106 to display, for example, the characters "tro train" with the partial search query "me" to complete the partial search query and form the first query suggestion "metro train." Thus, for example, based on search history data 117 and the partial search query "me" the query suggestion system 118 predicts "metro train" will be the final search query, e.g., based on the search history data and the query suggestion "metro train" having the highest probability of being selected by the user.

In response to "metro train" being the first query suggestion, i.e., the query suggestion with the highest rank, the query suggestion system 118 causes the client device 106 to present search results 227a-n in the search interface 222. The search results 227a-n are responsive to the first query suggestion "metro train." For example, the search engine 110 receives a query suggestion request from the client device 106 rendering the web search page 220. The query suggestion system 118 identifies and provides the query suggestions and search results responsive to the highest ranked query suggestion to the client device 106. The client device 106 presents the query suggestions in the query suggestion box 232 according to a rank, and presents the search results 227 that are responsive to the highest-ranked query suggestion.

Assume the user is not satisfied with the query suggestions or related search results and, therefore, further refines the partial search query by including additional or different characters in the partial search query or, alternatively, the user knows that metro train is not the desired query and continues typing in the query. The data for the revised partial search query, including the different or additional characters, is received by the query suggestion system 118. In turn, the query suggestion system 118 identifies query suggestions based on the revised partial search query and the search history data 117.

Figure 2C:
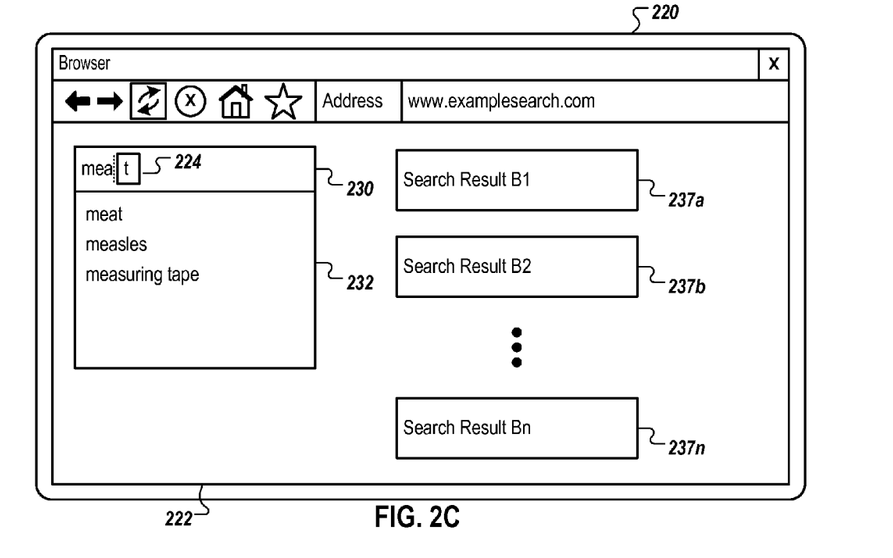

FIG. 2C shows the progression from FIG. 2B where the query suggestion system 118 receives data for an additional character "a" entered in the query input field 230, e.g., by the user, so that the partial search query is "mea." In response, the query suggestion system 118 identifies query suggestions based on the search history data 117 and the partial search query "mea" and provides the query suggestions "meat," "measles" and "measuring tape" to the client device 106.

The query suggestion system 118 causes the client device 106 to display the character "t" with the partial search query "mea" to complete the partial search query and form the first query suggestion "meat," which, for example, the query suggestion system 118 predicts will be the final search query for the partial search query "mea." In response to "meat" being the first query suggestion for the partial search query "mea," the query suggestion system 118 causes the client device 106 to delete search results 227a-n from the search interface 222, for example, so that the partial search query "mea" is not displayed with search results 227a-n. Further, provided that the query suggestion "meat" does not meet the filtering criterion, the query suggestion system 118 will then cause the client device 106 to display search results 237a-n, which are responsive to first query suggestion "meat." For example, if "meat" is classified as belonging to the query suggestion topic "food" and the filtering criterion specifies a medical topic, then the search results 237a-n are displayed in the search interface window 222 as the query suggestion topic "food" does not match the medical filtering criterion topic.

Returning to the decision block 206 of the process 200, now assume the process 200 determines the first query suggestion meets the filtering criterion. In response to determining that the first query suggestion meets the filtering criterion, in some implementations, the process 200 prevents search results, e.g., image search results, responsive to the first query suggestion from being presented to the user, at process 210. Thus, the query suggestion system 118 can cause the client device 106 to not display search results if any query suggestion topic matches any topics specified by the filtering criterion. For example, in some implementations, the query suggestion system 118 provides the first query suggestion to the client device 106, and if the query suggestion topic is a medical topic and the topic specified by the filtering criterion is also a medical topic, then the query suggestion topic matches the filtering criterion topic and the query suggestion system 118 causes the client device 106 to prevent the search results responsive to the first query suggestion from being displayed, as described with reference to FIG. 2D.

Figure 2D:
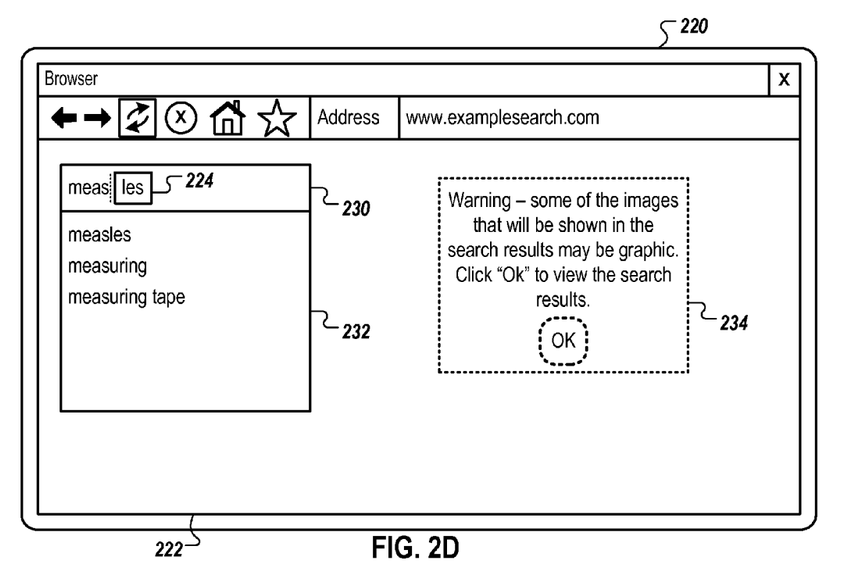

FIG. 2D shows the progression from FIG. 2C where the query suggestion system 118 receives data for an additional character "s" entered in the query input field 230, e.g., by the user, so that the partial search query is "meas." In response, the query suggestion system 118 identifies query suggestions based on the search history data 117 and the partial search query "meas" and provides the query suggestions "measles," "measuring" and "measuring cup" to the client device 106 for display.

In query suggestion completion box 224, the query suggestion system 118 causes the client device 106 to display the character "les" with the partial search query "meas" to complete the partial search query and form the first query suggestion "measles," which the query suggestion system 118 predicts will be the final search query for the partial search query "meas."

In response to "measles" being the first query suggestion for the partial search query "meas," the query suggestion system 118 causes the client device 106 to remove search results 237a-n from the search interface 222, and to not display search results responsive to first query suggestion "measles." Given that image search results responsive to measles may potentially be graphic or objectionable to some users, in some implementations, the query suggestion system 118 prevents the automatic display of those images. Thus, in some implementations where search results, e.g., image search results, responsive to the first query suggestion are displayed, if the query suggestion system 118 determines that first query suggestion topic matches a filtering criterion topic, then search results will not be displayed with the query suggestions, as shown in FIG. 2D.

More generally, subsequent to the query suggestion system 118 causing the client device 106 to display search results responsive to a previous query suggestion, e.g., "meat,", the query suggestion system 118 can cause the client device 106 to prevent search results, e.g., image search results, responsive to a subsequent query suggestion, e.g., "measles," from being displayed to the user if the subsequent query suggestion or suggestions meets or meet the filtering criterion such that search results are not displayed, including those responsive to the previous query suggestion. However, in other implementations, search results responsive to the previous query suggestion or other lower ranked query suggestions in the subsequent set of query suggestions, e.g., "measuring," "measuring tape," etc., that do not meet the filtering criterion can be displayed in place of the search results responsive to the subsequent query suggestion, e.g., "measles."

In some scenarios, a user may desire to view the search results responsive to a query suggestion that meets the filtering criterion. For example, the user may enter the partial search query "meas" in an attempt to satisfy the user's informational need for the measles medical condition. In turn, in some implementations, the query suggestion system 118 causes the identified query suggestion or suggestions, e.g., "measles," to be displayed on the user's client device. As described above, if the query suggestion topic for the query suggestion is the same as or similar to the filtering criterion topic, the query suggestion system 118 can prevent the client device 106 from displaying search results responsive to the query suggestion. For example, the query suggestion system 118 can prevent the display of search results, e.g., image search results, responsive to the query suggestion "measles" such as images of persons having measles.

However, if the user desires to view search results for the query suggestion, e.g., "measles," the query suggestion system 118 can cause the client device 106 to accept certain user actions as an indication of the user's desire to view the responsive search results. Upon receipt of data indicating the user's desire to view the responsive search results from the client device 106, the query suggestion system 118 can cause the client device 106 to display the search results, e.g., image search results, responsive to the query suggestion, e.g., "measles," that were previously prevented from being displayed. For example, the indication can be a user selection of the query suggestion, e.g., a mouse click, a keystroke entered, e.g., pressing enter on the keyboard, or even the selection of a "Warning" pop-up 234, shown in phantom.

Further, in some implementations, the query suggestion system 118 can moderate the determination of whether to allow search results responsive to a query suggestion having a topic that matches a filtering criterion topic based on a known preference of the user initiating the query suggestion request. For example, a first user may have a high tolerance for graphic images and a second user may have a low tolerance for graphic images. Each of the user's tolerance levels can be represented in respective preference data for the users, e.g., as stored in user account data for the users or as reflected in the users' web browser settings.

Thus when determining if certain search results responsive to a query suggestion should be displayed to a user, the query suggestion system 118 can, in some implementations, base the determination on both the comparison of the query suggestion topic or topics to the filtering criterion topic or topics and the user preference data. For example, if the topic for a query suggestion matches a filtering criterion topic, the query suggestion system 118, nonetheless, can cause the client device 106 to display the search results to the first user as the first user's preference data indicates the first user has a high tolerance for graphic images. Conversely, in some implementations, for these same search results, the query suggestion system 118 would not cause the search results to be displayed to the second user as the second user's preference data indicates the second user has a low tolerance for graphic images.

In some implementations, each of the filtering criterion topics is associated with a weight that reflects the likelihood of the content classified in a corresponding topic being graphic or objectionable in nature. Furthermore, in some implementations, a weight is associated with each of the various levels of tolerance of a user to various types of graphic or objectionable content. The query suggestion system 118 can base the determination of whether certain search results responsive to a query suggestion should be displayed to a user on the comparison of the query suggestion and filtering criterion topics, a comparison of the weight of the applicable filtering criterion topic and the weight of the tolerance level for the requesting user, or a combination of both. For example, even if the query suggestion system 118 determines that the topics for the query suggestion and filtering criterion match, the query suggestion system 118 can, nonetheless, cause the client device 118 to display the respective search results to the user if the tolerance level weight for the user exceeds the filtering criterion topic weight. More generally, the query suggestion system 118 can cause or not cause the client device 118 to display the respective search results based on a comparison between the tolerance level weight and the filtering criterion topic weight.

Figure 2E:
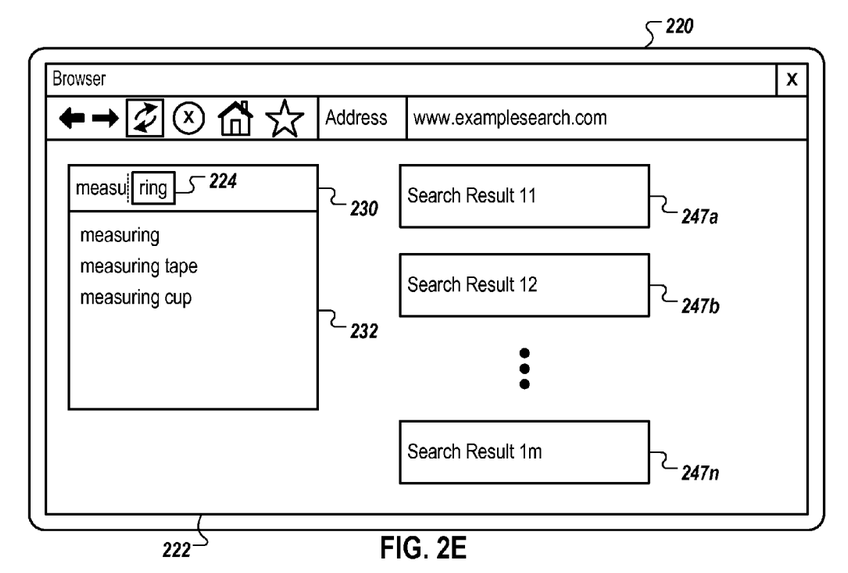

FIG. 2E shows the progression from FIG. 2D where the query suggestion system 118 receives data for an additional character "u" entered in the query input field 230, e.g., by the user, so that the partial search query is "measu." In response, the query suggestion system 118 identifies query suggestions based on the search history data 117 and the partial search query "measu" and provides the query suggestions "measuring," "measuring tape" and "measuring cup" to the client device 106.

In query suggestion completion box 224, the query suggestion system 118 causes the client device 106 to display the characters "ring" with the partial search query "measu" to complete the partial search query and form the first query suggestion "measuring," which the query suggestion system 118 predicts will be the final search query for the partial search query "measu."

In response to "measuring" being the first query suggestion for the partial search query "measu," the query suggestion system 118 determines whether the query suggestion topic for "measuring" meets the filtering criterion topic or topics. Provided that the query suggestion system 118 determines that the query suggestion topic does not meet the filtering criterion topic or topics, the query suggestion system 118 can cause the client device 106 to display search results 247a-n, which are responsive to first query suggestion "measuring." For example, if "measuring" is classified as belonging to the query suggestion topic "construction" and the filtering criterion specifies a medical topic, and does not specify a construction topic, then the search results 247a-n are displayed in the search interface window 222 where previously search results responsive to the last query suggestion "measles" were not displayed.

More generally, subsequent to the query suggestion system 118 causing the client device 106 not to display search results responsive to a previous query suggestion, e.g., "measles," the query suggestion system 118 can cause the client device 106 to display search results, e.g., image search results, responsive to a subsequent query suggestion, e.g., "measuring," if the subsequent query suggestion or suggestions does or do not meet the filtering criterion.

The process 200 receives a revised partial search query that includes the partial search query and an additional character, at process 212. For example, the query suggestion system 118 receives data specifying the additional characters for the revised partial search query and returns to process 204 to generate query suggestions for the revised partial search query with the additional character or characters. After the query suggestions have been generated for the revised partial search query, the query suggestion system 118 returns to process 206 and to process 208 or 210 depending on the outcome of process 206. The query suggestion system 118 can also receive a different partial search query at process 212, e.g., a partial search query that does not include all of the characters from the previous partial search query, at process 212 and, in response, returns to process 204 to generate query suggestions for the different partial search query. In this way the query suggestion system 118 iterates through some or all of processes 202-212 to address various partial search queries based on whether the partial search queries are refinements of previous partial search queries or wholly different partial search queries.

As described above, in some implementations, the query suggestion system 118 determines whether search results responsive to a query suggestion will be displayed based on a comparison of the query suggestion topic or topics associated with the query suggestion to the filtering criterion topic or topics. Accordingly, a query suggestion can be classified as belonging to one or more topics.

Figure 3:
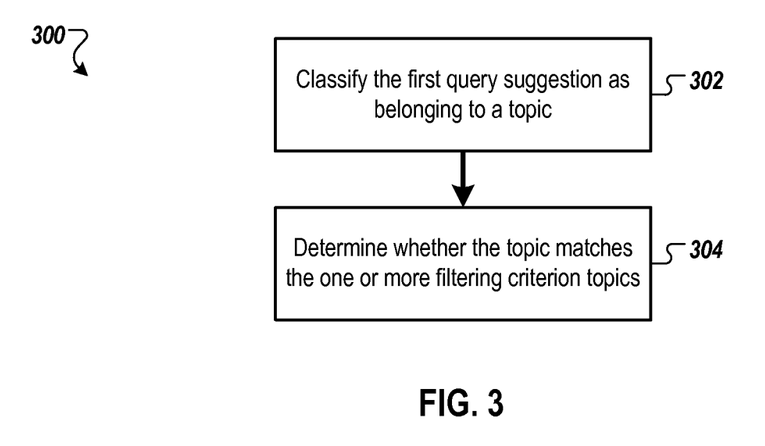
FIG. 3 is flow diagram of a process for determining if a topic in which a query suggestion is classified matches one or more topics specified by a filtering criterion.

FIG. 3 is flow diagram of a process for determining if a topic in which a query suggestion is classified matches one or more topics specified by a filtering criterion.

The process 300 classifies the first query suggestion as belonging to a first topic, at process 302. In some implementations, the query suggestion system 118 classifies a query suggestion as belonging to one or more applicable topics. For example, if the query suggestion is "measles," the query suggestion system 118 can classify the query suggestion as belonging to a medical topic. Likewise, if the query suggestion is "football," the query suggestion system 118 may classify the query suggestion as belonging to a sports topic and an entertainment topic. In some implementations, the query suggestion system 118 uses support vector machines to classify the query suggestions as belonging to particular topics.

The process 300 determines whether the first topic matches one or more filtering criterion topics, at process 304. In some implementations, the query suggestion system 118 determines whether the topic in which the query suggestion is classified matches a topic identified or specified by the filtering criterion, e.g., a filtering criterion topic. In some implementations, process 300 is a subprocess of process 206.

In some implementations, the partial search queries are search queries for images, the query suggestions are query suggestions for an image search query, and the search results are image search results. However, other search query and result types can be processed by the query suggestion system 118.

In general, the query suggestion system 118 can receive characters defining a partial search query, e.g., a portion of a final search query. For one or more received characters, the query suggestion system 118 can generate a corresponding query suggestion for the partial search query predicting the final search query based on the received character or characters from the partial search query and, in some implementations, the order in which the character or characters were or was received. The query suggestion system 118 can determine whether the query suggestion meets a filtering criterion. In response to determining that the query suggestion does not meet the filtering criterion, the query suggestion system 118 can provide search results, e.g., image search results, responsive to the query suggestion. Conversely, in response to determining that the query suggestion meets the filtering criterion, the query suggestion system 118 can prevent search results, e.g., image search results, responsive to the query suggestion from being presented to a user.

§4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA, field programmable gate array, or an ASIC, application specific integrated circuit. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD- ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network, "LAN," and a wide area network, "WAN", an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, from a user device, a partial search query comprising one or more characters;
   generating first query suggestions based on the partial search query, the query suggestions ordered according to a ranking;
   determining that a first query suggestion in a first rank position for which a first set of one or more images responsive to the first query suggestion will be provided to the user device for presentation meets a filtering criterion, wherein the filtering criterion is a criterion specifying one or more filtering criterion topics against which the first query suggestion is evaluated independent of search results responsive to the first query suggestion;
   providing, by one or more processors, the first query suggestions to the user device according to the ranking;
   in response to determining that the first query suggestion in the first rank position meets the filtering criterion, preventing, before the first set of one or more images responsive to the first query suggestion are presented on the user device, from being presented on the user device;
   receiving a revised partial search query that comprises the partial search query with an additional character;
   generating second query suggestions based on the revised partial search query;
   determining that second query suggestion in the first rank position for which a second set of one or more images responsive to the second query suggestion will be provided to the user device for presentation does not meet the filtering criterion;
   providing the second set of query suggestions to the user device; and
   in response to determining that the second query suggestion in the first rank position for which the second set of one or more images responsive to the second query suggestion will be provided to the user device for presentation does not meet the filtering criterion, providing the second set of one or more images responsive to the second query suggestion for presentation on the user device.

2. The method of claim 1, wherein determining that the first query suggestion meets the filtering criterion comprises:
   classifying the first query suggestion as belonging to a topic; and
   determining whether the topic matches the one or more filtering criterion topics.

3. The method of claim 2, wherein preventing the first set of one or more images responsive to the first query suggestion from being presented comprises determining that the topic matches the one or more filtering criterion topics.

4. The method of claim 1, further comprising:
   classifying the first query suggestion as belonging to a topic; and
   wherein providing the first set of one or more images responsive to the first query suggestion comprises determining that the topic does not match the one or more filtering criterion topics.

5. The method of claim 1, further comprising:
   receiving data indicating a user selection of the first query suggestion in the first rank position; and
   in response to receiving the data indicating the user selection of the first query suggestion and subsequent to the preventing, providing the first set of one or more images.

6. The method of claim 1, wherein the partial search query is an image search query.

7. The method of claim 1, wherein the filtering criterion is a criterion specifying a medical topic.

8. The method of claim 1, wherein the first rank position is a highest ranked query suggestion relative to the other query suggestions.

9. A system, comprising:
one or more processors; and
a computer-readable medium coupled to the one or more processors having instructions stored thereon which, when executed by the one or more processors, cause the one or more processors to perform operations comprising:
receiving, from a user device, a partial search query comprising one or more characters;
generating first query suggestions based on the partial search query, the query suggestions ordered according to a ranking;
determining that a first query suggestion in a first rank position for which a first set of one or more images responsive to the first query suggestion will be provided to the user device for presentation meets a filtering criterion, wherein the filtering criterion is a criterion specifying one or more filtering criterion topics against which the first query suggestion is evaluated independent of search results responsive to the first query suggestion;
providing, by one or more processors, the first query suggestions to the user device according to the ranking;
in response to determining that the first query suggestion in the first rank position meets the filtering criterion, preventing, before the first set of one or more images responsive to the first query suggestion are presented on the user device, from being presented on the user device;
receiving a revised partial search query that comprises the partial search query with an additional character;
generating second query suggestions based on the revised partial search query;
determining that second query suggestion in the first rank position for which a second set of one or more images responsive to the second query suggestion will be provided to the user device for presentation does not meet the filtering criterion;
providing the second set of query suggestions to the user device; and
in response to determining that the second query suggestion in the first rank position for which the second set of one or more images responsive to the second query suggestion will be provided to the user device for presentation does not meet the filtering criterion, providing the second set of one or more images responsive to the second query suggestion for presentation on the user device.

10. The system of claim 9, wherein determining that the first query suggestion meets the filtering criterion comprises:
classifying the first query suggestion as belonging to a topic; and
determining whether the topic matches the one or more filtering criterion topics.

11. The system of claim 10, wherein preventing the first set of one or more images responsive to the first query suggestion from being presented comprises determining that the topic matches the one or more filtering criterion topics.

12. The system of claim 9, wherein the computer-readable medium has further instructions stored thereon which, when executed by the one or more processors, cause the one or more processors to perform operations comprising:
classifying the first query suggestion as belonging to a topic; and
wherein providing the first set of one or more images responsive to the first query suggestion comprises determining that the topic does not match the one or more filtering criterion topics.

13. The system of claim 9, wherein the computer-readable medium has further instructions stored thereon which, when executed by the one or more processors, cause the one or more processors to perform operations comprising:
receiving data indicating a user selection of the first query suggestion in the first rank position; and
in response to receiving the data indicating the user selection of the first query suggestion and subsequent to the preventing, providing the first set of one or more images.

14. The system of claim 9, wherein the partial search query is an image search query and the filtering criterion is a criterion specifying a medical topic.

15. The system of claim 9, wherein the first rank position is a highest ranked query suggestion relative to the other query suggestions.

16. A non-transitory computer storage medium encoded with a computer program, the program comprising instructions that when executed by data processing apparatus cause the data processing apparatus to perform operations, comprising:
receiving, from a user device, a partial search query comprising one or more characters;
generating first query suggestions based on the partial search query, the query suggestions ordered according to a ranking;
determining that a first query suggestion in a first rank position for which a first set of one or more images responsive to the first query suggestion will be provided to the user device for presentation meets a filtering criterion, wherein the filtering criterion is a criterion specifying one or more filtering criterion topics against which the first query suggestion is evaluated independent of search results responsive to the first query suggestion;
providing, by one or more processors, the first query suggestions to the user device according to the ranking;
in response to determining that the first query suggestion in the first rank position meets the filtering criterion, preventing, before the first set of one or more images responsive to the first query suggestion are presented on the user device, from being presented on the user device;
receiving a revised partial search query that comprises the partial search query with an additional character;
generating second query suggestions based on the revised partial search query;
determining that second query suggestion in the first rank position for which a second set of one or more images responsive to the second query suggestion will be provided to the user device for presentation does not meet the filtering criterion;
providing the second set of query suggestions to the user device; and
in response to determining that the second query suggestion in the first rank position for which the second set of one or more images responsive to the second query suggestion will be provided to the user device for presentation does not meet the filtering criterion, providing the second set of one or more images responsive to the second query suggestion for presentation on the user device.

17. The non-transitory computer storage medium of claim 16, wherein the first rank position is a highest ranked query suggestion relative to the other query suggestions.

* * * * *